May 6, 1958  C. D. MILLER  2,833,131
RESILIENT COUPLING
Filed Oct. 25, 1954

INVENTOR.
C. David Miller
BY Gray, Mase
& Dunson
ATTORNEYS.

United States Patent Office 2,833,131
Patented May 6, 1958

2,833,131

RESILIENT COUPLING

Carl David Miller, Columbus, Ohio, assignor, by mesne assignments, to The Cooper-Bessemer Corporation, Marion, Ohio, a corporation of Ohio Application October 25, 1954, Serial No. 464,529

12 Claims. (Cl. 64—27)

This invention relates to a resilient coupling. It comprises a novel elastic connection between a driving member and a driven member to absorb fluctuations in torque and slight misalignment between these members.

Briefly, this resilient coupling comprises: a hub member which may be attached to a shaft; a wheel member which may be attached to another shaft or engaged by a belt or other means to transmit torque; a plurality of hollow elastic spokes connected between the wheel member and the hub member by means which provide for the enclosure of the spokes to form fluid chambers; a fluid reservoir that is in communication with the chambers and that is preferably provided within the structure of either the wheel member or the hub member, or may be the fluid chamber of another spoke; and a fluid in the chambers and the reservoirs.

In one preferred embodiment of this invention, two groups of spokes are oppositely disposed and connected between the wheel member and the hub member, so that rotation in one direction will be imparted to one of the members by tension in one group of spokes and in the opposite direction by tension in the second group of spokes. In this embodiment, since there is a group of spokes disposed to drive in tension for either direction, the resilient coupling is capable of operation in either direction of rotation and of being used with either the wheel member or the hub member as the driving member.

In another preferred embodiment of this invention, all of the spokes are disposed in such a manner that they will operate in tension for one direction of rotation only. Although this embodiment may be operated in one rotational direction, either the wheel member or the hub member may be the driving member.

In the past, resilient couplings have been constructed which made use of rigid-wall piston and cylinder mechanisms adapted to drive either in compression or in tension, and to absorb fluctuations in torque by movement of the piston within the cylinder. A fluid has been provided in the piston to produce a dampening effect and to prevent rapid reoccurring oscillation that may be out of phase with the fluctuating torque cycle.

These prior devices have been characterized by the disadvantages that they comprise many machined parts which are precision built and, therefore, expensive to manufacture. Further, these devices normally have a metallic compression spring which is subject to fatigue and early failure.

Accordingly, it is an object of this invention to provide a resilient coupling wherein rotation is produced in the driven member by tension in a plurality of elastic spokes. It is another object to provide a resilient coupling in which sliding and moving parts are eliminated, and replaced with flexible, elastic, tubular spokes of lesser cost and long life. Still another object is to provide a resilient coupling in which the spokes are reinforced with a fabric. Yet another object is to provide a resilient coupling in which the tubular spokes are reinforced with a fabric disposed on a bias to the longitudinal axis of the spoke, which provides for maximum flexure of the side walls of the spoke during the elongation or shortening of the spoke.

To these and other ends, this invention comprises apparatus which is disclosed in a preferred form in the following description and attached drawings.

Figure 1:
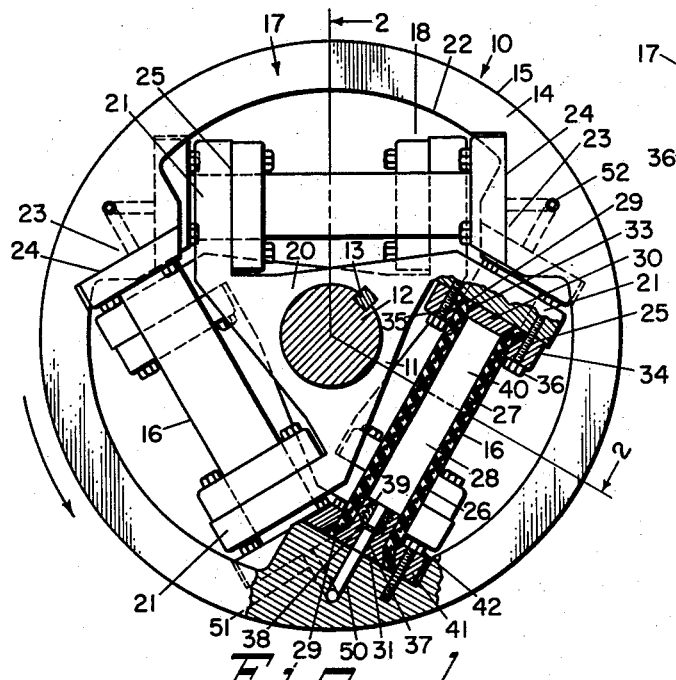
Fig. 1 is a partially sectioned, elevational view of one embodiment of this invention.

Referring to Fig. 1, a resilient coupling, designated generally as 10, comprises a hub member 11, fixed against rotation on a shaft 12, by a key 13; a wheel member 14 having a peripheral surface 15 adapted to drive or be driven by a belt or other means not shown; and a plurality of resilient spokes 16. The resilient spokes 16 are fastened between the wheel member 14 and the hub member 12, and adapted so that one will drive the other by tension in the spokes 16.

Figure 2:
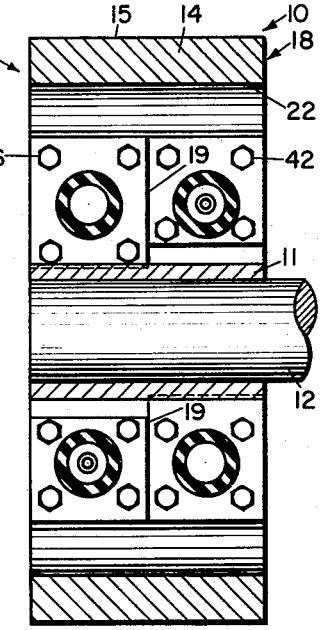
Fig. 2 is a sectional view taken along the lines 2—2 of Fig. 1.

The embodiment of the resilient coupling 10 shown in Figs. 1 and 2 comprises a first or left side designated generally as 17, and a second or right side designated generally as 18. The first side 17 is geometrically similar to the second side 18, with the exception that the first side 17 is the mirror image of the second side 18. The line of image-similarity reversal is a line designated as 19, on the longitudinal center of the resilient coupling 10, as seen in Fig. 2. The resilient coupling 10 is viewed in Fig. 1 toward the first side 17, which will be described with particularity. It will be apparent that the description as related to the first side 17 will be equally applicable to the second side 18 with due consideration for the mirror image reversal.

The configuration and shape shown of the hub member 11 and the wheel member 14 is one preferred form that is adapted to conform with minimum space requirements. The hub member 11 comprises a substantially triangular central portion 20 having flanged portions 21 at the apices of the triangular portion 20. The wheel member 14 has a substantially annular inner surface 22 having a plurality of boss portions 23 of a number corresponding to the number of flanged portions 21 on the hub member 11. The boss portions 23 are provided with a machined face 24. The flanged portions 21 are provided with a machined face 25. The flanged members 21 and the boss members 23 are arranged in such a manner that the machined surfaces 24 and 25 are substantially parallel to provide mating pairs.

The hollow resilient spoke 16 comprises a tubular portion of resilient material, such as rubber, preferably reinforced with wire or cloth fabric 26 if the transmission loading requires. Between an inner surface 27 and an outer surface 28 at each end 29, the spoke 16 is outwardly flared between inner retainer means 30 and 31, respectively. The closed end inner retainer means 30 is provided with an annular sloping surface 33 adapted to fit in the flanged ends 29 of the spokes 16. A retainer plate 34 is adapted to fit over the outer surface 28 of the spoke 16 and is provided with a suitable sloping annular surface 35. The retainer plate 34 is clamped to the face 25 of flanged portion 21 by fastening means 36, such as a machine bolt, and is capable of being tightened against the ends 29 of the spokes 16 to provide a fluid-tight seal at the spoke end 29.

At the opposite end, the inner retainer means 31 is provided with a passage 37, which is adapted to receive an orifice plate 38, held in place by a threaded orifice retainer nut 39. The orifice plate 38 and the orifice retainer nut 39 are centrally bored to the passage 37 from a chamber 40, formed by the hollow of the spokes 16 and the insert members 30 and 31.

In a manner similar to the closed end, a retainer plate 41 is clamped down on the flared end 29 of the spoke 16 by bolts 42 providing a fluid-tight seal at the closed end spoke connection.

The passage 37 of the insert 31 is in communication with the passage 50 in the boss 23, which is connected to a similar passage 51 communicating with an oppositely disposed spoke 16 of the second side 18 of the resilient coupling 10. Plugs 52 may be used to close exterior openings in the sides of the bosses 23 made in the construction of the communicating passageways 50 and 51.

Before considering the operation of the resilient coupling 10, consideration will be momentarily given to the enumeration of the four different conditions of operation to which the resilient coupling may be subjected. As viewed in Fig. 1, (a) the hub 11 may be the driving member in a counterclockwise direction, (b) the wheel member 14 may be the driving member in a clockwise direction, (c) the hub member may be the driving member in a clockwise direction, and (d) the wheel member may be the driving member in a counterclockwise direction.

In the embodiment of this invention shown in Fig. 1, under the first two conditions (a) and (b), the load is carried in tension by the spokes 16 in the first side 17 of the resilient coupling 10. Under the last two conditions the load is carried in tension by the spokes 16 in the second side 18 of the resilient coupling 10. For purposes of illustration, it will be assumed that the wheel 14, in Fig. 1, is to be driven by the hub member 11 in a counterclockwise direction as shown by the arrow. The torque exerted through the hub member 11 is applied as a pull on the spoke 16 at the closed end. This pull is exerted as a tension force through the walls of the spokes 16 to the wheel 14 at the open end boss position 23, which applies a rotational moment to the wheel 14. The spoke 16, being resilient, absorbs abnormally high force fluctuations and provides for smoother running characteristics for the driven wheel 14.

Since the resilient spoke is an energy storage device, rebounding over compensation in the opposite direction may be a serious problem when the transmitted force decreases rapidly. For this reason, it is preferred that the spokes 16 of opposite sides 17 and 18 be in communication through passages 37 and 50, and that the chamber 40 of each spoke be filled with a fluid. This fluid is "pumped" from the chamber 40 of one spoke 16 on one side 17 to the chamber 40 of the other spoke 16 on the second side 18 of the coupling 10, and the chambers 40 of the spokes 16 on one side act as the reservoirs for the spokes 16 on the other side. This pumping is achieved by the alternate decrease and increase of the internal diameter and, consequently, the internal volume, of each spoke 16, which is produced by the elastic elongation and retraction of the spoke 16 under alternating load conditions. The orifice means 38 is provided with an aperture of a size which provides for proper fluid flow restriction to effectively dampen rapid force fluctuations under the operating conditions of the particular installation.

Since the spokes 16 on the first side 17 are always in tension when the spokes 16 on the second side 18 are under compression, the spokes 16 on the first side 17 will have a minimum internal volume when the spokes 16 on the second side 18 have a maximum internal volume. The spokes may be completely filled with fluid, and may be under pressure. The amount of pressure may be used as a means to control the amount of resilience of the coupling 10.

In certain installations, for example, in situations where the coupling 10 must be of minimum size and carry maximum loads, the walls of the spokes 16 may be provided with fabric reinforcement 26. The longitudinal and transverse axes of the weave of the fabric are preferably disposed on a bias to the longitudinal axis of the spoke 16. This disposition provides maximum variation in tube internal diameter and volume, per unit change in spoke length.

If it is desired to provide a resilient coupling according to this invention that is load transmitting in one direction only, a resilient coupling may be provided having only the structure which corresponds to the first side 17 or the second side 18 of the embodiment shown in Figs. 1 and 2. Such a coupling 55 is partially shown in Fig. 3. In this embodiment of the invention, a wheel member 56 having a boss portion 57 is provided with a reservoir cavity 58 to receive a fluid through a passage 59 in communication with a passage 60 in an insert member 61 having check valve means 62, such as a ball 75 and seat 76, in communication with a chamber 63 of a hollow resilient spoke 64. Orifice passages 77 are provided between the passage 59 and the chamber 63. A grid retainer 78 is threaded in the insert member 61 to keep the ball 75 in close proximity to the seat 76.

The tubular hollow resilient spoke 64 is fastened to the boss portion 57 by a retainer plate 65 held by suitable fastening means such as bolts 66. The other end of the spoke 64, not shown, is fastened in a similar manner to a portion of a hub member 67 which is connected to a shaft, no shown.

Figures 3, 4:
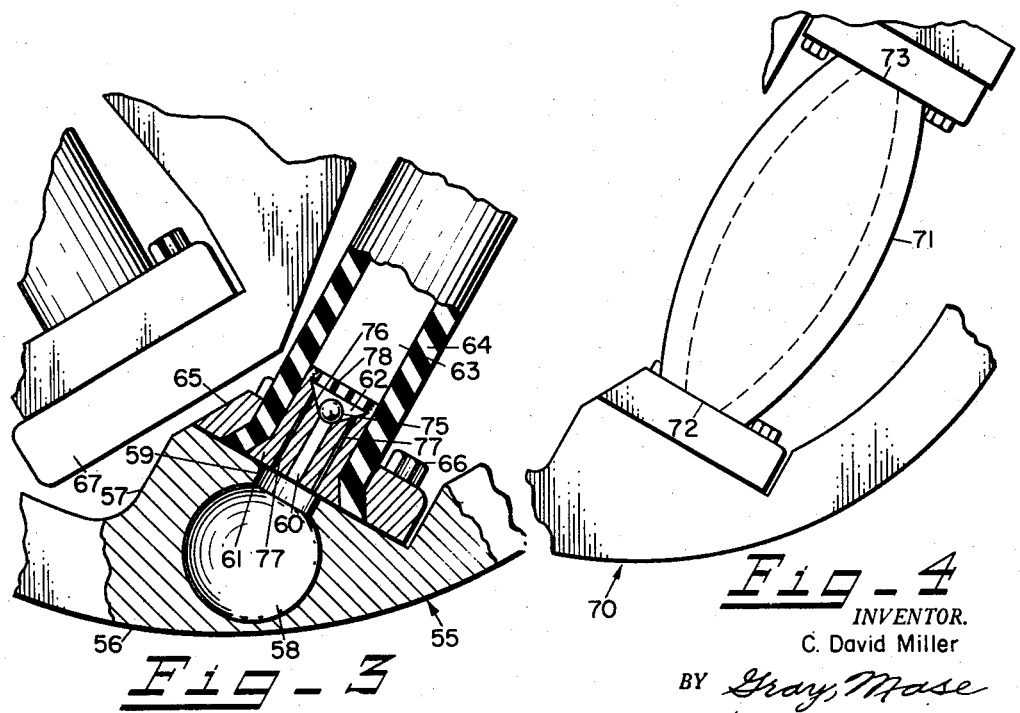
Fig. 3 is a partially sectioned elevational view of a portion of another embodiment of this invention.
Fig. 4 is a partial and schematic elevational view of another form of a spoke of this invention.

The tubular hollow resilient spoke 64 is shown in Fig. 3 as having walls of unreinforced resilient material while the walls of the spoke 16 are shown in Fig. 1 with reinforcing therein for reasons previously described. In certain installations, for example, in situations where the coupling 55 must be of minimum size and carry maximum loads, the walls of the spoke 16 may be provided with fabric reinforcement also.

In the embodiment shown in Fig. 3, the fluid is pumped into and out of the chamber 63 from and to the reservoir 58. Under conditions when the coupling 55 is transmitting an increasing load, the check valve means 62 is closed and fluid passes from chamber 63 into passage 58 at a slow rate through passages 77. Under conditions when the transmitted load is decreasing, the check valve means 62 is open allowing rapid fluid flow into the chamber 63. The check valve means 62 is provided to compensate for the greatly reduced fluid pumping pressure developed in the chamber 63 when the transmitted load is decreasing. This reduced pressure is the result of the fact that spokes 64, being resilient, transmit practically negligible load in compression.

In other respects, the operation of the embodiment shown in Fig. 3 is the same as the embodiment shown in Figs. 1 and 2, except that as previously stated, the embodiment shown in Fig. 3 is capable of operation in one direction only for either driver—or driven-member situation. Since the resilient spokes 64 would normally be incapable of columnar or compression loading, the reason for such one-way leading is apparent.

In some circumstances, it may be preferable that resilient coupling 10 of the first embodiment or resilient coupling 70 of the second embodiment be provided with resilient spokes 71 having arcuate bowed wall contours, as shown in Fig. 4. The use of spokes having such a shape provides for maximum internal volumetric change in the spoke 71 per unit of length change between the spoke ends 72 and 73.

It will be understood, of course, that while the forms of the invention herein shown and described constitute the preferred embodiment of the invention, it is not intended herein to illustrate all of the possible equivalent forms or ramifications of the invention.

For instance, in the first embodiment, individual reservoirs may be provided for each spoke or one reservoir may be provided for all the spokes of the coupling. In the second embodiment of the invention, the reservoir may be placed in the hub member instead of the wheel member, and the check valve and orifices transferred to the opposite end of the spoke. Only one reservoir may be used for all the spokes. Further, a one-way resilient coupling may be provided having some spokes pumping into reservoirs in the hub and some pumping into reservoirs in the wheel. The reservoirs may be connected together. Of course, external reservoir means may be provided.

It will also be understood that the words used are words of description rather than of limitation, and that various changes, such as changes in shape, relative size, and arrangement of parts, may be substituted without departing from the spirit or scope of the invention herein disclosed.

What is claimed is:

1. A resilient coupling comprising: a hub member; a wheel member; a plurality of load-transmitting tubular resilient spokes, one end of each of said spokes being fastened to said hub member and the opposite end of each of said spokes being fastened to said wheel member, providing a chamber for fluid in the hollow of each of said spokes, one of said members disposed to drive the other of said member by tension in said spokes irrespective of the pressure of a fluid in said chambers; at least one fluid reservoir in communication with said chambers; and a fluid in said chambers and said at least one reservoir, said fluid serving only to control the resilience of said spokes.

2. A resilient coupling according to claim 1, wherein said spokes have outwardly-bowed sidewalls between the connections to said hub member and said wheel member.

3. A resilient coupling according to claim 1 wherein the communication between said at least one fluid reservoir and said fluid chamber comprises a passage with orifice means for controlling the rate of fluid flow therebetween.

4. A resilient coupling comprising: a hub member; a wheel member; a plurality of tubular resilient spokes having fabric reinforced side walls, one end of each said spokes being fastened to said hub member and the opposite end of each of said spokes being fastened to said wheel member providing a fluid chamber in the hollow of each of said spokes, one of said members serving to drive the other of said members by tension in said spokes; at least one fluid reservoir in communication with said chambers; and a fluid in said chambers and said at least one reservoir.

5. A resilient coupling comprising: a hub member; a wheel member; a plurality of tubular resilient spokes having metallic mesh fabric reinforced side walls, one end of each of said spokes being fastened to said hub member and the opposite end of each of said spokes being fastened to said wheel member providing a fluid chamber in the hollow of each of said spokes, one of said members serving to drive the other of said members by tension in said spokes; at least one fluid reservoir in communication with said chambers; and a fluid in said chambers and said at least one reservoir.

6. A resilient coupling comprising: a hub member; a wheel member; a plurality of tubular resilient spokes having metallic mesh fabric reinforced side walls, said fabric disposed in said side walls on a bias to the longitudinal axis of said spokes, one end of each of said spokes being fastened to said hub member and the opposite end of each of said spokes being fastened to said wheel member providing a fluid chamber in the hollow of each of said spokes, one of said members serving to drive the other of said members by tension in said spokes; at least one fluid reservoir in communication with said chambers; and a fluid in said chambers and said at least one reservoir.

7. A resilient coupling according to claim 1 wherein said at least one reservoir is formed within said wheel member.

8. A resilient coupling according to claim 1 wherein said spokes are equispaced about the center of said hub member and similarly disposed to drive said one of said members in one direction only.

9. A resilient coupling according to claim 8 wherein check valve means is provided in said fluid communication between said at least one reservoir and said chambers.

10. A resilient coupling comprising: a hub member; a wheel member; a plurality of tubular resilient spokes, one end of each said spokes being fastened to said hub member and the opposite end of each of said spokes being fastened to said wheel member, providing a fluid chamber in the hollow of each of said spokes; a first group of said plurality of said spokes disposed to drive one of said members by tension in said spokes during rotation in one direction; a second group of said plurality of said spokes disposed to drive the same one of said members in the opposite direction by tension in said second group of said spokes; at least one fluid reservoir in communication with said chambers; and a fluid in said chambers and said at least one reservoir.

11. A resilient coupling comprising: a hub member; a wheel member; a plurality of tubular resilient spokes, one end of each of said spokes being fastened to said hub member and the opposite end of each of said spokes being fastened to said wheel member providing a fluid chamber in the hollow of each said spokes, one of said members serving to drive the other of said members by tension in said spokes; a first group of said plurality of said spokes disposed to drive one of said members during rotation in one direction and a second group of said plurality of said spokes disposed to drive the same one of said members in the opposite direction; the chambers of the spokes of each group serving as a reservoir for fluid for said other group.

12. A resilient coupling comprising: a hub member; a wheel member; a plurality of tubular resilient spokes, one end of each said spokes being fastened to said hub member and the opposite end of each of said spokes being fastened to said wheel member, providing a chamber in the hollow of each said spokes, one of said members serving to drive the other of said members by tension in said spokes; a first group of said plurality of said spokes disposed to drive one of said members during rotation in one direction and a second group of said plurality of said spokes disposed to drive the same one of said members in the opposite direction; a fluid in said chambers; and a fluid communication means between said first group of said spokes and said second group of said spokes, said fluid communication means being between pairs of said spokes comprising one spoke from each of said groups, said chambers of each of said groups serving as the reservoirs for the fluid from the chambers of said other group.

References Cited in the file of this patent

UNITED STATES PATENTS

| | | |
|---|---|---|
| 1,815,639 | Wilkin et al. | July 21, 1931 |
| 2,316,820 | Thelander | Apr. 20, 1943 |

FOREIGN PATENTS

| | | |
|---|---|---|
| 650,888 | Great Britain | Mar. 7, 1951 |